Oct. 22, 1935.  H. C. SCHONHOFF ET AL  2,018,580

FLOOD WATER GATE

Filed Sept. 17, 1934

Herman C. Schonhoff
and Samuel Breed
INVENTOR

BY *Victor J. Evans & Co.*
ATTORNEY

Patented Oct. 22, 1935

2,018,580

UNITED STATES PATENT OFFICE 2,018,580

FLOOD WATER GATE

Herman C. Schonhoff and Samuel Breed,
Elizabeth, Ill.

Application September 17, 1934, Serial No. 744,410

3 Claims. (Cl. 39—4)

The invention relates to gates and more especially to flood water gates.

The primary object of the invention is the provision of a gate of this character, wherein the construction thereof assures the opening of the same when confronting water within a creek, stream or other water contributory, so that when the water is high it can pass the gate, as well as debris, such as weeds or the like, and will avoid the passage of animals at the opening for the gate so as to avoid the straying of live stock from one field enclosure to another.

Another object of the invention is the provision of a gate of this character, wherein the same is made up of a plurality of corrugated sections, these being suspended from a cable or the like for working disposition with respect to a creek, stream or other water course, the sections being mounted with the cables in a novel manner and susceptible of vertical adjustment to vary the extent of the gate in its entirety with relation to a body of water as contained within the creek, stream or other water course, and such gate automatically opens and closes under the influence of the water within the course.

A further object of the invention is the provision of a gate of this character which is simple in its construction, thoroughly reliable and efficient in its operation, strong, durable, economical in the manufacture and inexpensive to install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
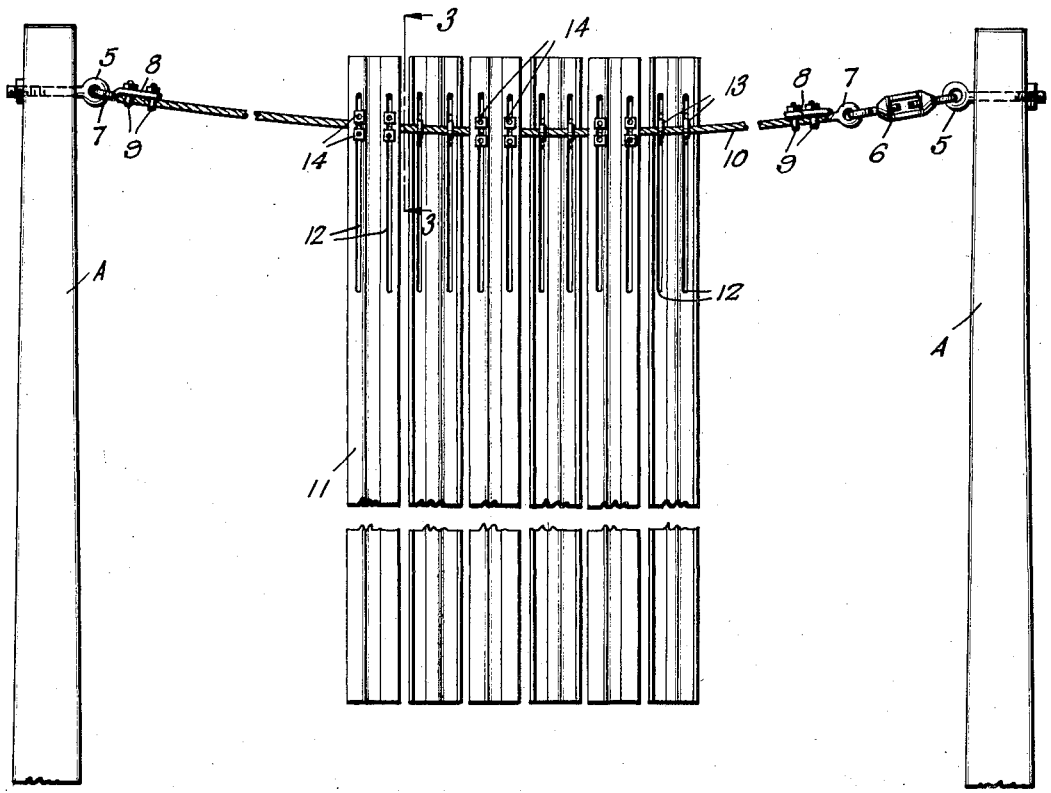
Figure 1 is an elevation of the gate constructed in accordance with the invention.
Figure 2:
Figure 2 is a top edge view.
Figure 3:
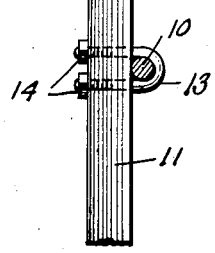
Figure 3 is a sectional view on the line 3—3 of Figure 1 looking in the direction of the arrows.

Referring to the drawing in detail, A designates vertical uprights or posts, these being suitably anchored at their lower ends in opposite banks of a water bed or course, as for example, a stream, creek or the like, and may be made from any suitable material for assuring longevity thereto. Carried by the uprights or posts A near the upper ends thereof are eye bolts 5, the eyes of which are located at the inner side thereof, and loosely linked with one of the eyes is a turnbuckle 6, while connected with the other eye and with said turnbuckle are terminal eye couplings 7, each having a flat extension 8 for fitting of U clips 9 therewith. These clips 9 embrace the ends of a suspension cable 10 from which is hung the gate hereinafter to be described.

This gate comprises a series of slat formation corrugated sections 11, each having in one end portion spaced longitudinally disposed slots 12 which are removed from the uppermost end of said section 11. Engageable about the cable 10 are the U clips 13, the cable being disposed at one side of the series of sections 11 which are arranged in slightly spaced parallel relation to each other, and such clips 13 are passed through the pairs of slots 12 in the respective sections 11 and carry securing nuts 14 which are turned home against the ribbed seats 15 of the said sections. The channeled sides 16 accommodate the closed portions of the clips 13, so that the cable 10 can be firmly and securely clamped with the sections 11 for the suspension of these, as is shown in Figure 1 of the drawing.

The gate, including the sections 11, is suspended from the cable 10 to within a water course and by its own weight will be closed until a sufficient water pressure is brought against the same to overcome the weight of the said gate, whereupon the latter will swing to an open position for permitting flood water to continue to flow its course in the creek, stream or the like and at the same time liberating debris, such as weeds or other matter contained within the water. The gate, when in its closed position, prevents the passage of live stock through the gap as confronted by the gate and thereby retarding the straying of the stock from one field enclosure to another by way of the water course.

It should be apparent that the sections 11 are susceptible of vertical adjustment to alter the suspension thereof and such adjustment is had by rearranging the clips 13 in the slots 12 and staying such rearrangement by the nuts 14 as carried by the clips.

What is claimed is:

1. A gate of the kind described comprising a plurality of spaced parallel elongated sections having at one end of each spaced longitudinally disposed slots, a suspension cable for the sections, and clips engaging the cable and adjustably engaged in said slots for the hanging of the plurality of sections.

2. A gate of the kind described comprising a plurality of spaced parallel elongated sections having at one end of each spaced longitudinally disposed slots, a suspension cable for the sections, clips engaging the cable and adjustably engaged in said slots for the hanging of the plurality of sections, and supports adapted for arrangement at opposite banks of a water course and having connection with the cable at its opposite ends.

3. A gate of the kind described comprising a plurality of spaced parallel elongated sections having at one end of each spaced longitudinally disposed slots, a suspension cable for the sections, clips engaging the cable and adjustably engaged in said slots for the hanging of the plurality of sections, supports adapted for arrangement at opposite banks of a water course and having connection with the cable at its opposite ends, each section being corrugated in a longitudinal direction, and fasteners for the clips for adjustably securing the same in the slots in said sections.

HERMAN C. SCHONHOFF.
SAM BREED.